3,353,772
POSITIONING AND ISOLATION APPARATUS
FOR A HORIZONTAL VIBRATOR
Delbert W. Fair and J. H. Miller, Ponca City, Okla., assignors to Continental Oil Company, Ponca City, Okla., a corporation of Delaware
Filed Apr. 13, 1966, Ser. No. 542,315
9 Claims. (Cl. 248—20)

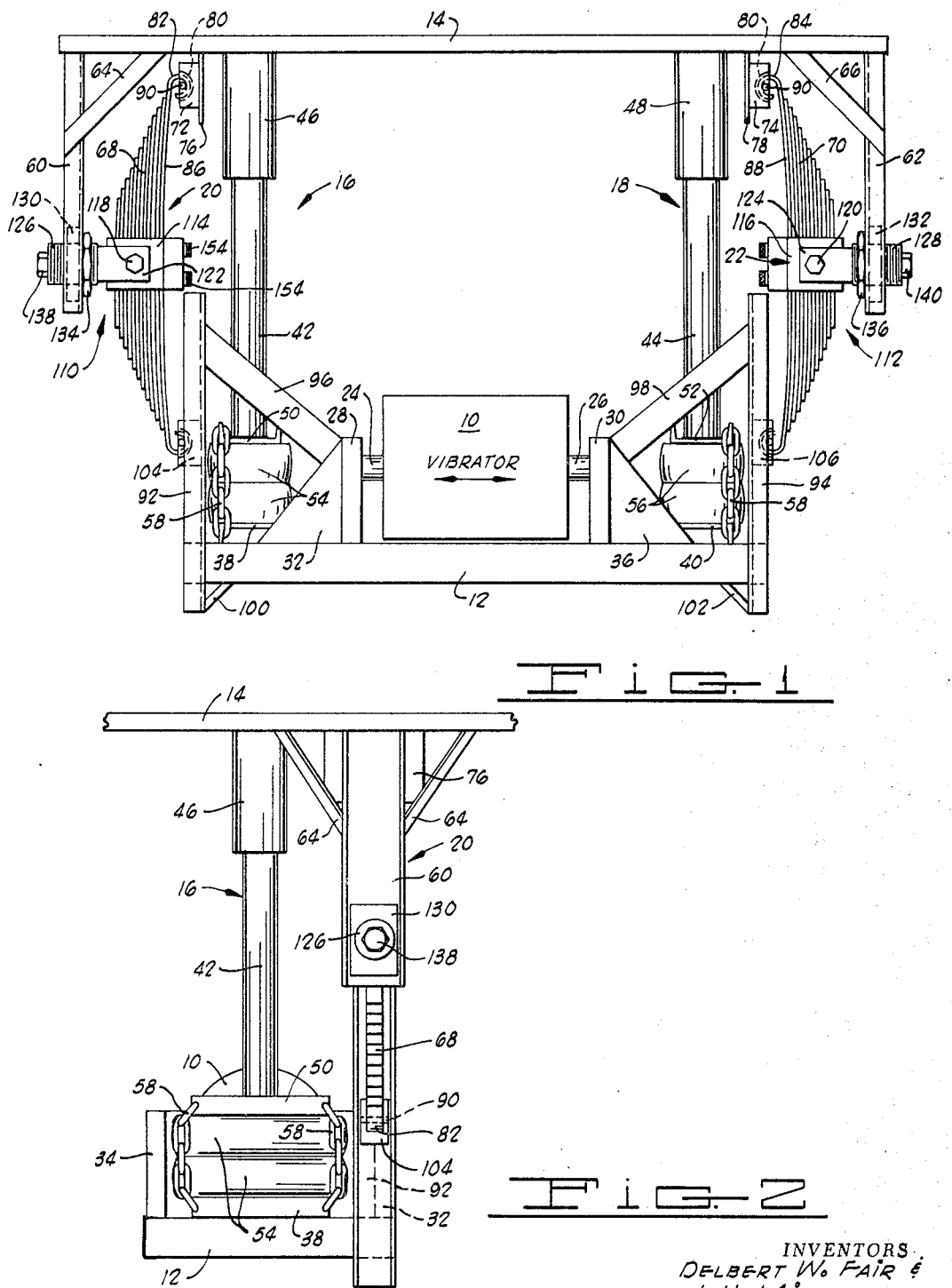

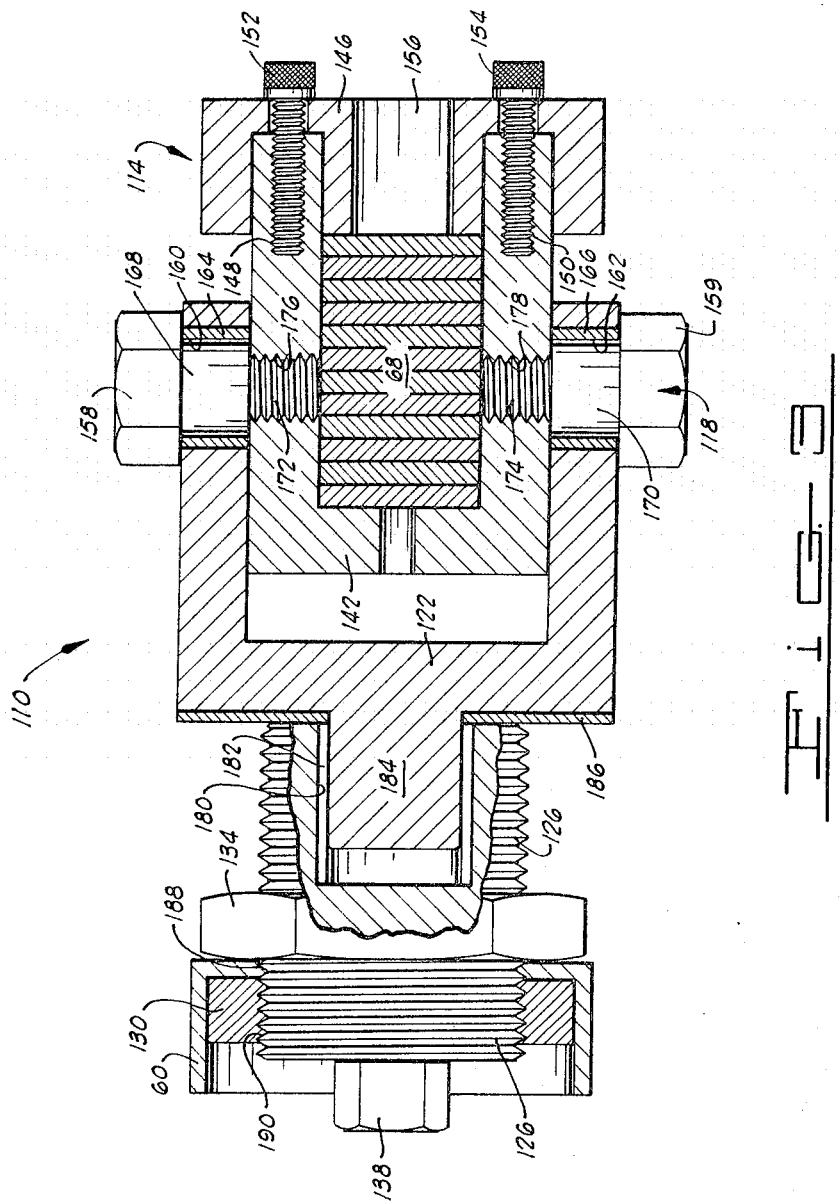

This invention relates to improvements in the art of seismic wave generation and, more particularly, but not by way of limitation, to an improved apparatus for generating and coupling shear forces to an earth medium.

The invention constitutes an improvement over previously employed transducer apparatus which provided isolation of the support vehicle and horizontal components of vibration by means of coil springs or other resilient, constant tension assemblies. The improved apparatus relies upon a leaf spring to provde more efficient isolation of horizontal vibrations as well as adjustable spring tension which allows application of proper horizontal counter-forces between the support vehicle and the vibration transducer to provide continual positioning of the vehicle mass above the vibration transducer.

The present invention contemplates seismic wave generation apparatus of the vehicle-mounted type wherein a vibrator is mounted on a base member which is maintained in coupling contact with an earth medium through vertical force as applied between said vehicle or positioning mass and said base member, and the vehicle is further isolated from horizontal vibration by means of leaf springs which are attached under predetermined tension between each side of the vehicle and the vibrator unit.

Therefore, it is an object of the present invention to provide a vehicle-mounted, shear wave transducing device capable of more efficient coupling or shear wave energy into an earth medium and which can be easily and rapidly coupled and decoupled for wave generation at successive sites.

It is further an object of this invention to provide an apparatus which enables isolation of a support vehicle or weighting mass from the vibrator for a horizontal mode of oscillation while maintaining a required vehicle position relative to the vibrator baseplate or coupling member.

Finally, it is an object of the present invention to provide a vehicle-mounted, vibrational shear wave transducer which may be positioned and coupled under the weight of the support vehicle, and which will enable horizontal vibration isolation, by oppositely oriented leaf spring assemblies, each of which has adjustable tension.

Other objects and advantages of the invention will be evident from the following detailed description when read in conjunction with the accompanying drawings which illustrate the invention.

In the drawings:

FIG. 1 is a rear view of the vibrator and vehicle mounting arrangement;

FIG. 2 is a side view of the mounting arrangement of FIG. 1; and

FIG. 3 is a top view of a spring clamp and clevis arrangement, partially in section, which is employed in the apparatus of FIGS. 1 and 2.

Referring now to the drawings, and in particular to FIGS. 1 and 2, a horizontal vibration transducer constructed in accordance with the present invention is shown as it might be viewed from the rear of a support vehicle or other positioning mass. A vibrator 10, which may be any of many horizontal vibrators which are employed in the art, is securely mounted to apply its vibration to a baseplate 12, a coupling element which is maintained in contact with the vibration transmitting medium. The vibrator 10 and baseplate 12 are suspended below a vehicle or supporting mass such as the truck bed 14 by means of the extensible standards 16 and 18. Further positioning and horizontal vibration isolation are afforded by the compound leaf spring assemblies 20 and 22 which are located on each side of the vibrator assembly.

The vibrator 10, as indicated, may be any one of the known types of seismic energy vibration transducers, i.e., hydraulic, pneumatic, electro-mechanical, etc. The end thrust rods 24 and 26 of the vibrator 10 are securely mounted in respective vibrator support plates 28 and 30. The vibrator support plates 28 and 30 are welded or otherwise rigidly secured in parallel alignment across the baseplate 12. The vibrator support plate 28 is further strengthened by angle braces 32 and 34 (see FIG. 2), which are suitably welded as indicated, and similar angle braces 36 and one more rearward (not designated) secure the vibrator support plate 30 relative to the baseplate 12.

In order to hold the baseplate 12 in firm contact with the earth surface and to insure that the coupling member is continually coupled to the earth during operation, it is essential that a static weight load be applied to hold the transducer down in the event that the total weight of the transducer is not sufficient for this purpose, as will nearly always be the case. Therefore, the standards 16 and 18 are employed for supporting the weight of the vehicle over the baseplate 12 as the static weight load.

The standards 16 and 18 are affixed to the baseplate 12 through resilient assemblies which serve to damp any vertical components of vibration which may be present. A pair of inverted channel members 38 and 40 are welded transversely at each end of the baseplate 12 as indicated. A pair of vertical columns 42 and 44 extend upward through suitable sleeve members 46 and 48 to be connected to suitable hydraulic jack mechanism situated on the truck bed 14 of the support vehicle. A second pair of channel members 50 and 52 are rigidly secured to the lower ends of the vertical columns 42 and 44, respectively. A pair of resilient, pneumatic pillow bags 54, preferably constructed of neoprene and suitably bonded together, are disposed between the two channels 38 and 50, and similarly, a pair of pneumatic pillow bags 56 are disposed between the channels 40 and 52 on the opposite side. The several pillow bags 54 and 56 may be connected to the respective channels 38, 40, 50 and 52 in any suitable manner whereby they are retained in the proper position. Thus, it will be noted that when the vertical columns 42 and 44 are lowered, the force exerted downwardly through the vertical columns 42 and 44 will be resiliently transmitted on through the pillow bags 54 and 56 to the baseplate 12.

A plurality of chains 58 interconnect the channels 38 and 50 and 40 and 52 so that the pillow bags 54 and 56 will not be stretched or broken when the vibrator assembly is raised up under the support vehicle for transportation or shifting of the shooting site. The foregoing apparatus, the vibrator, pillow bag mounting, and hydraulic positioning equipment is well-known in the art and is the particular subject matter of U.S. Patent No. Re. 25,401 entitled "System for Anchoring and Transporting a Seismic Vibrator" in the name of Clynch, and U.S. Patent No. 3,159,233 entitled "Seismic Transducer Construction" in the name of Clynch et al. Both of the above patents are assigned to the present assignee.

The compound leaf spring assemblies 20 and 22 are mounted on each side of the truck bed 14 to afford secure positioning of the truck or other support vehicle, when raised to the weighting position, as well as isolation from the horizontal components of vibration. A pair of channel members 60 and 62 are rigidly secured as by welding or other suitable fastening means to the truck bed 14.

Strengthening members, such as braces 64 and 66, may be supplied in well-known manner. The suspended channels 60 and 62 suport or tension the central portion of leaf springs 68 and 70 as will be further described. The leaf spring 68 and 70 may be the well-known type of multi-leaf compound spring, similar to that employed for automobile suspension; however, other equivalent forms of elongated resilient member may be substituted in some cases. The upper ends of springs 68 and 70 are movably affixed by means of bearing shoes 72 and 74 which are slidingly positioned upon the bearing plates 76 and 78. The bearing plates 76 and 78, disposed in parallel relationship on each underside of truck bed 14, may be welded or otherwise rigidly secured beneath the truck bed 14. The bearing shoes 72 and 74 are preferably bronze blocks formed with a cylindrical recess 80 therein. The looped retaining ends 82 and 84 of the lower spring leaves 86 and 88, respectively, are received in the recesses 80 and suitably pinned or otherwise movably fastened as by a fastener indicated at 90.

The lower ends of the compound leaf spring assemblies 20 and 22 (spring leaves 86 and 88) are also slidingly maintained within a pair of vertical channel members 92 and 94. The vertical channel members 92 and 94 are secured within corner cut-outs of the baseplate 12, as by welding, and further support is afforded by diagonal braces 96 and 98 which are fastened rigidly to the respective angle braces 32 and 36. Further diagonal braces 100 and 102 are welded to support the lower ends of the vertical channel members 92 and 94 below the level of baseplate 12. The lower ends of leaf springs 68 and 70 (spring leaves 86 and 88) are affixed to shoes 104 and 106 in the same manner as the attachment of upper shoes 72 and 74. Thus, when the vibrator assembly is raised or lowered during field operation, the opposing horizontal tensions of spring assemblies 20 and 22 will be continuously exerted against the slide-way or vertical channel members 92 and 94.

The center of the leaf springs 68 and 70 are supported with adjustable tension by means of clevis assemblies 110 and 112. The clevis assemblies 110 and 112 comprise (see FIG. 1) spring clamps 114 and 116 secured by bolt assemblies 118 and 120 in respective sleeves 122 and 124. The sleeves 122 and 124 are rotatably secured to the respective channel members 60 and 62 by tension bolts 126 and 128, respectively. The tension bolt 126 is clamped to the channel member 60 by a block 130 and lock nut 134, and the tension bolt 128 is clamped to the channel member 62 by a block 132 and lock nut 136. It will also be observed in FIG. 1 that the tension bolts 126 and 128 are provided with hex head extension 138 and 140, respectively, to facilitate adjusting the tension of the springs 68 and 70 as will be set forth below.

Referring now to FIG. 3, the clevis assembly 110 (left side) is shown in enlarged and cut-away form (a top view). The spring clamp portion 114 comprises a U-shaped member 142 through which extends the multi-leaf spring 68. The spring 68 is securely clamped in the member 142 by a cap member 146. The member 142 has two pairs of tapped holes 148 and 150 for receiving respective pairs of machine bolts 152 and 154. The bolts 152 and 154 hold the cap member 146 against the spring 68 and then clamp the spring in the member 142. A central opening 156 is provided in the cap member 146 to allow access to the compound leaf spring 68, since some types of springs employ a centrally located securing bolt. Thus, the adjustable clamp 114 will serve to receive any number of spring leaves within predetermined limits.

The U-shaped member 142 is pivotally affixed within the clevis or yoke 122 by means of the bolt assembly 118 comprising a pair of bearing bolts 158 and 159. The yoke member 122 has oppositely positioned holes 160 and 162, each of which is lined with a suitable bearing sleeve 164 or 166. The bearing bolts 158 and 159 are each machined to have bearing surfaces 168 and 170 mating with the respective bearing sleeves 164 and 166. The inner end portions 172 and 174 of the bolts 158 and 159 are received in tapped holes 176 and 178 formed in opposite sides of the U-shaped member 142. Hence, the U-shaped member 142, and thus the leaf spring 68, are pivotally secured within the yoke member 122.

The yoke member 122 is, in turn, rotatably secured within the tension bolt 126, shown partially cut away. The tension bolt 126 is machined to have a cylindrical opening 180 lined with a bearing sleeve 182 for rotatably receiving a cylindrical extension 184 of the yoke member 122. A suitable washer 186 is positioned between the end of tension bolt 126 and the respective tension end of yoke member 122. The other end of the tension bolt 126 is inserted through a hole 188 in the vertical channel 60 and is secured by a mounting block 130 containing properly tapped hole 190. The lock nut 134 is placed on the tension bolt 126 and can be drawn tightly against the vertical channel member 60 to maintain a rigid connection of the clevis assembly 110. Thus, it can be seen that manipulation of the lock nut 134 and the tension bolt 126 (by means of hex head 138) will allow the tension of leaf spring assembly 20 to be set at any of various settings. Similar adjustment for leaf spring assembly 22 is made by positioning of tension bolt 128 and lock nut 136 with the aid of hex head extension 140.

In the operation of the shear wave or horizontal vibration transducer, the transport vehicle carrying the vibrator assembly is driven to a preselected location, whereupon a seismic shot series is initiated. In the transport attitude, the hydraulics carried on the truck bed 14 (such as disclosed in Patent No. Re: 25,401) would have been operated to retract the vertical columns 42 and 44 to their uppermost positions. Thus, the vibrator assembly is compactly tucked up under the rear of the truck bed for transport. There is no need to adjust or secure the leaf spring assemblies 20 and 22 since their respective lower shoes 104 and 106 can be maintained at the same horizontal tension while sliding to any position along the vertical channel members 92 and 94.

Upon arriving at a selected shooting site, the system hydraulics may be actuated to extend the standards 16 and 18; that is, the vertical columns 42 and 44 are extended downward, forcing the baseplate 12 into firm engagement with the earth's surface and raising the weight of the truck vertically over the vibrator assembly to act as the static weight load. In so doing, the shoes 104 and 106, riding in respective vertical channel members 92 and 94, will slide to the more upward extremities of channel members 92 and 94, still exerting the same horizontal tensions upon said channels.

The spring tension may then be set for each of the compound leaf spring assemblies 20 and 22 by loosening the respective lock nuts 134 and 136 and setting the spring tension by rotating the tension bolts 126 and 128 to a desired horizontal insertion with respect to mounting blocks 130 and 132 and channel members 60 and 62. Once the desired tension is obtained, the lock nuts 134 and 136 can be drawn tightly against the channel members 60 and 62. The amount of tension to be placed in the leaf spring assemblies 20 and 22 will depend upon the terrain, the type of vibrational shot sequence, etc. The tension is set with a view toward compressing the leaf springs a required amount in order to pre-load the truck in the horizontal direction. Optimally, this pre-loading of the truck by the leaf spring assemblies 20 and 22 applies a horizontal repositioning force to the truck which is twice the spring constant of each spring multiplied by the distances that the truck moves from the required center position relative to the baseplate. It can be stated generally that the repositioning force would only be about one-half of the required amount without such pre-loading.

A further advantage is gained by the present apparatus in that the spring constant of the leaf spring assemblies 20 and 22 may be changed within wide limits by merely changing the number of leaves. Thus, depending upon the operation, more or less spring leaves may be inserted or combined in the leaf springs 68 and 70 to vary both the internal damping of the spring members themselves and the compound spring constant.

As a vibration or shot sequence is carried out, vibrational seismic waves are imparted into the earth medium at increased efficiency. The compound leaf springs assemblies 20 and 22 are freely movable in all directions due to the clevis-type center connections (110 and 112) of springs 68 and 70 and the slidable shoe connections at the ends of the springs. Thus, the horizontal spring tension serves to position the vehicle mass over the vibrator baseplate 12, and to maintain it thereat throughout a vibration interval with least variation of the downward force while still isolating the vehicle from horizontal vibrations of the vibrator assembly; and further, no interfering or binding forces can enter in due to the freedom of movement in all directions which is afforded the leaf spring assemblies 20 and 22.

When a shot sequence is completed and it is necessary to move onto a next shooting site, the hydraulics can be energized to withdraw the vertical columns 42 and 44, thereby raising the vibrator 10 and baseplate 12 from contact with the ground. At the same time, the vertical channel members 92 and 94 merely slide upward, the spring shoes 104 and 106 being maintained within their respective slide-ways during transport, i.e., with the vibrator assembly in its raised position.

The foregoing sets forth a novel apparatus which insures positive coupling of vibrational shear wave energy into an earth medium at all reciprocal forces generated by the vibrator. The vibrator and coupling baseplate are vibrationally isolated from the support vehicle, such that a reduced interaction between the coupling weight or downward force of the vehicle and the shear wave apparatus gives rise to minimum considerations of shear wave frequency which must be accounted for in analyzing any returned signals. Further, the apparatus provides increased lateral repositioning forces to the support vehicle relative to the vibrator and baseplate which serve to maintain proper position of the static mass at all times such that a more constant downward force is exerted.

Changes may be made in the combination and arrangement of elements as heretofore set forth in this specification and shown in the drawings; it being understood, that changes may be made in the embodiment disclosed without departing from the spirit and scope of the invention as defined in the following claims.

What is claimed is:

1. Apparatus for positioning and isolating a horizontal vibrator comprising:
   a baseplate supporting the vibrator for coupling horizontal vibrations into an earth medium;
   positioning mass means for bearing downward upon said base plate to insure firm positioning upon said earth medium; and
   a pair of leaf spring means having their respective centers affixed to said positioning mass and being oppositely oriented with the upper ends of each spring means bearing upon said mass means and the lower ends of said spring means bearing upon said vibrator means to isolate the positioning mass from horizontal vibrations.

2. Apparatus for positioning and isolating a horizontal vibrator as set forth in claim 1 wherein each of said leaf spring means comprises:
   a compound leaf spring having an upper end bearing on said mass means;
   means pivotally securing the center of said leaf spring to said mass means; and
   means rigidly connected to said baseplate to provide a bearing surface for receiving the lower end of said leaf spring in vertical sliding contact.

3. Apparatus as set forth in claim 2 wherein said means pivotally securing the center of said compound leaf spring comprises:
   spring clamp means affixed to the center of said leaf spring;
   clevis means pivotally securing said spring clamp means; and
   tension bolt means rotatably receiving said clevis means, said tension bolt means being secured to said mass means whereby variation of said tension bolt means varies the re-positioning force applied by said spring to said baseplate and mass means.

4. Apparatus for positioning and isolating a truck-mounted horizontal vibrator comprising:
   a baseplate supporting the vibrator for coupling horizontal vibrations into an earth medium;
   means for supporting said truck above said baseplate to bear downward thereon and thus insure firm positioning upon said earth medium;
   a pair of leaf spring means oppositely oriented and disposed on opposite sides of said vibrator, each of said leaf spring means having one end bearing upon said truck and the opposite end bearing upon said vibrator;
   tensioning means for securing the centers of said leaf springs to said truck to impart a counteracting spring tension to each side of said vibrator means.

5. Apparatus for positioning and isolating a horizontal vibrator as set forth in claim 4 wherein said leaf spring means extend vertically and characterized further to include:
   vertical channel members rigidly secured on opposite sides of said baseplate slidingly receiving the lower ends of said leaf springs.

6. Apparatus for positioning and isolating a horizontal vibrator as set forth in claim 4 wherein said means for supporting said truck above said baseplate comprises:
   resilient means affixed to each side of said baseplate;
   standard means affixed to and extending upward from each of said resilient means to support the weight of said truck on said baseplate.

7. Apparatus for positioning and isolating a horizontal vibrator as set forth in claim 4 wherein each of said leaf spring means comprises:
   a compound leaf spring of predetermined spring constant; and
   a pair of bearing shoes rotatably affixed to each end of said compound leaf spring.

8. Apparatus for positioning and isolating a horizontal vibrator as set forth in claim 4 wherein each of said tensioning means comprises:
   spring clamp means affixed to the center of the respective leaf spring means;
   clevis means pivotally securing said spring clamp means; and
   tension bolt means rotatably receiving said clevis means, said tension bolt means being secured to said truck whereby variation of said tension bolt means varies the re-positioning force applied by said leaf spring means to said baseplate and truck.

9. Apparatus for positioning and isolating a truck-mounted horizontal vibrator comprising:
   a vibrator baseplate for coupling vibrational seismic energy into an earth medium;
   a pair of vibrator support means rigidly secured to said baseplate on opposite sides thereof and on opposite sides of the vibrator;
   means for supporting said truck above said baseplate to bear downward thereon and thus insure firm positioning upon said earth medium;
   a pair of compound leaf springs, each having bearing shoes rotatably affixed to each end;

a pair of vertical bearing surfaces rigidly secured to each side of said truck;

a pair of vertical support channels rigidly secured to each side of said truck;

a pair of vertical channel members rigidly secured to each side of said baseplate and extending upward therefrom; and tensioning means affixed to said vertical support channels and pivotally securing the centers of said leaf springs such that their upper bearing shoes bear upon said bearing surfaces and said lower bearing shoes bear slidably in said vertical channel members to impart a counteracting spring tension to each side of said baseplate.

References Cited
UNITED STATES PATENTS

| | | | |
|---|---|---|---|
| 2,064,751 | 12/1936 | Hussman | 248—21 |
| 2,729,332 | 1/1956 | Gruner | 248—358 X |
| 2,904,302 | 9/1959 | Cavanaugh et al. | 248—358 |
| 3,155,361 | 11/1964 | Balan | 248—358 |

JOHN PETO, *Primary Examiner.*